United States Patent
Eriksson et al.

(10) Patent No.: US 8,385,234 B2
(45) Date of Patent: Feb. 26, 2013

(54) MEDIA STREAM SETUP IN A GROUP COMMUNICATION SYSTEM

(75) Inventors: Anders Eriksson, Uppsala (SE); Per Boussard, Gustavsberg (SE); Tommy Falk, Spånga (SE); Magnus Westerlund, Kista (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 488 days.

(21) Appl. No.: 12/593,917

(22) PCT Filed: Mar. 29, 2007

(86) PCT No.: PCT/SE2007/000303
§ 371 (c)(1),
(2), (4) Date: Sep. 29, 2009

(87) PCT Pub. No.: WO2008/121032
PCT Pub. Date: Oct. 9, 2008

(65) Prior Publication Data
US 2010/0142413 A1   Jun. 10, 2010

(51) Int. Cl.
*H04L 12/16* (2006.01)
(52) U.S. Cl. ......... 370/261; 709/227
(58) Field of Classification Search ............ None
See application file for complete search history.

(56) References Cited

U.S. PATENT DOCUMENTS

| | | | | |
|---|---|---|---|---|
| 6,792,092 | B1* | 9/2004 | Michalewicz | 379/202.01 |
| 7,124,166 | B2* | 10/2006 | Brown | 709/204 |
| 7,162,533 | B2* | 1/2007 | Klemets | 709/231 |
| 2002/0105917 | A1 | 8/2002 | Rabipour | |
| 2003/0227908 | A1* | 12/2003 | Scoggins et al. | 370/352 |
| 2004/0111472 | A1* | 6/2004 | Swanson et al. | 709/204 |
| 2005/0243741 | A1* | 11/2005 | Flateby | 370/260 |
| 2006/0092269 | A1* | 5/2006 | Baird et al. | 348/14.08 |
| 2007/0133436 | A1* | 6/2007 | Provino et al. | 370/260 |
| 2010/0039963 | A1* | 2/2010 | Nagle et al. | 370/260 |

OTHER PUBLICATIONS

Rosenberg, J. and H. Schulzrinne, "An Offer/Answer Model with the Session Description Protocol (SDP)", RFC 3264, Jun. 2002.*

* cited by examiner

*Primary Examiner* — Brian Roberts

(57) ABSTRACT

A basic idea for efficient media communication between two nodes in a group communication system is to set up a number, N, of parallel, separate media streams of the same media type in a given direction between the nodes, where N is equal to or greater than 2. Before setting up the media streams, the actual number of media streams is negotiated (S1). Once the negotiation is completed, the media streams are established (S2). Media data of the same type can then be transferred in parallel, media streams (S3), where each media stream may include media data from a separate source or from a mix of sources. In this way, a richer and/or more personalized rendering of the media data is enabled since media data may be transported as individual media streams and processed locally in a participant, rather than processed and mixed into a single stream by a central mixer.

31 Claims, 10 Drawing Sheets

MEDIA STREAM SETUP IN A GROUP COMMUNICATION SYSTEM

TECHNICAL FIELD

The present invention generally relates to media communication in a group communication system, and more particularly to media stream setup and transport of media data in such a system.

BACKGROUND

Group communication systems such as audio/video conference systems generally employ a set of interactive communication technologies to enable a group of two or more distant communication units to interact via audio, video and/or other media communications. A group communication system such as a conference system is normally based on components for media (e.g. audio/video) input and output (such as cameras, microphones, monitors and loudspeakers) as well technology for (real-time) transport of generated media streams.

In general, to conduct a media conference including audio/video over the Internet or similar network the involved nodes must normally be able to receive and transmit media streams in real-time. When media content is streamed to a client in real-time, the client can begin to render the media content without having to wait for the complete stream to download. In fact, the stream may not have a predefined duration so downloading the entire stream before rendering it might not be possible at all. The term streaming media is often used to refer to both the technique of delivering media content over the network in real-time and the media content that is delivered.

Streaming media is everywhere you look on the web now days, e.g. in live radio and television broadcasts, and of course in audio and/or video conferences over the Internet.

With particular reference to conference communication systems, a flexible configuration of a conference call between two or more participants is based on peer-to-peer communication where all the participants receive all the media produced by the other participants and where there is no central point of control involved. This is termed a "loosely coupled conference". From a quality of experience point of view, the benefit of a loosely coupled conference is that all participants have access to all the generated media and a personalized presentation of the media can easily be implemented.

There are, however, several reasons why a loosely coupled conference may not be feasible in practice. Firstly, the total bandwidth may become prohibitively large for certain bandwidth limited links (e.g. wide area coverage radio transmission) as the number of participants in the conferences increases. Secondly, the participants may not have the processing capacity to receive and process the media from all the other end-points. Thus, this conference scenario is limited to participants having similar processing capacity and using a similar, high bandwidth, access technology.

To overcome these problems, a configuration where each participant connects to a central point (e.g. a conference bridge) may be employed. This is commonly referred to as a "tightly coupled conference". The central point mixes the incoming media from the participants, and sends the media mix to the participants.

In a tightly coupled conference where the mixing of the media is performed in a central point, the possibilities for a more personalized rendering of the incoming media by the participants are limited. In addition, different participants may have varying capabilities, e.g. with respect to processing capacity and bandwidth access. This is not accounted for, nor exploited in tightly coupled conference systems of the prior art.

There is thus a general need for improved media communication in a group communication system such as a conference system.

SUMMARY

The present invention overcomes these and other drawbacks of the prior art arrangements.

It is a general object of the present invention to provide improved media communication in a group communication system.

It is a specific object to provide an improved communication bridge for use in a group communication system.

It is also a specific object to provide an improved participant node for use in a group communication system.

In particular it is desirable to cater for highly efficient media communication and enable a richer and/or more personalized rendering of the media data.

When the participants have varying capabilities, it is important to be able to exploit the full capacity of the participants for creating rich media.

It may also be desirable to ensure that the delay in media is minimized, e.g. to avoid clipping of the media.

These and other objects are met by the invention as defined by the accompanying patent claims.

A basic idea for efficient media communication between two nodes in a group communication system is to set up at least two parallel, separate media streams of the same media type in a first direction between the nodes, where the actual number of these parallel, separate media streams is negotiated before setting up the media streams. Media data of the same type can then be transferred in parallel, separate media streams, where each media stream may include media data from a separate media source or from a mix of media sources.

In this way, a richer and/or more personalized rendering of the media data is enabled since media data may be transported as individual media streams and processed locally in a participant, rather than processed and mixed into a single stream by a central mixer.

The negotiation procedure allows for a flexible number of individual media streams (and optionally also selectable media format of at least one stream) between any two nodes such that the richest possible communication is achieved, according to the capabilities of the considered nodes.

When a new participant is switched onto a supported media stream, the system is normally configured such that the identity of the contributing source will change in packets transported over this media stream, and the receiving participant then has the ability to detect this immediately. This means that the receiving participant can start processing media data from the new participant without any delay.

Naturally, the number of media streams of the same media type to be established in the opposite direction between the considered nodes can also negotiated. Preferably, each node communicates to the other node capability information regarding how many simultaneous incoming media streams of the same media type and how many simultaneous outgoing media streams of the same media type the node can support, and the number of media streams of the same media type in each direction between the nodes is negotiated based on this capability information. This opens up for an asymmetric number of media streams in the two directions.

The invention also provides a communication bridge for use in a group communication system. The proposed bridge is configured for setting up at least two parallel, separate media streams of the same media type in a first direction between the bridge and a further node in the group communication system, and for negotiating with the further node regarding the actual number of these parallel, separate media streams before setting up the media streams. The bridge is further configured for mapping active media sources onto the established separate media streams.

In yet another aspect of the invention there is provided a participant node for use in a group communication system. The participant node is configured for sending a negotiation request to a central communication bridge including information on how many parallel separate media streams of the same media type the node can handle in at least one direction between the participant node and the central bridge. The participant node is further configured for receiving a negotiation response from the central bridge to enable establishment of a flexible number of parallel, separate media streams of the same media type.

Other advantages offered by the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS

Figure 1:
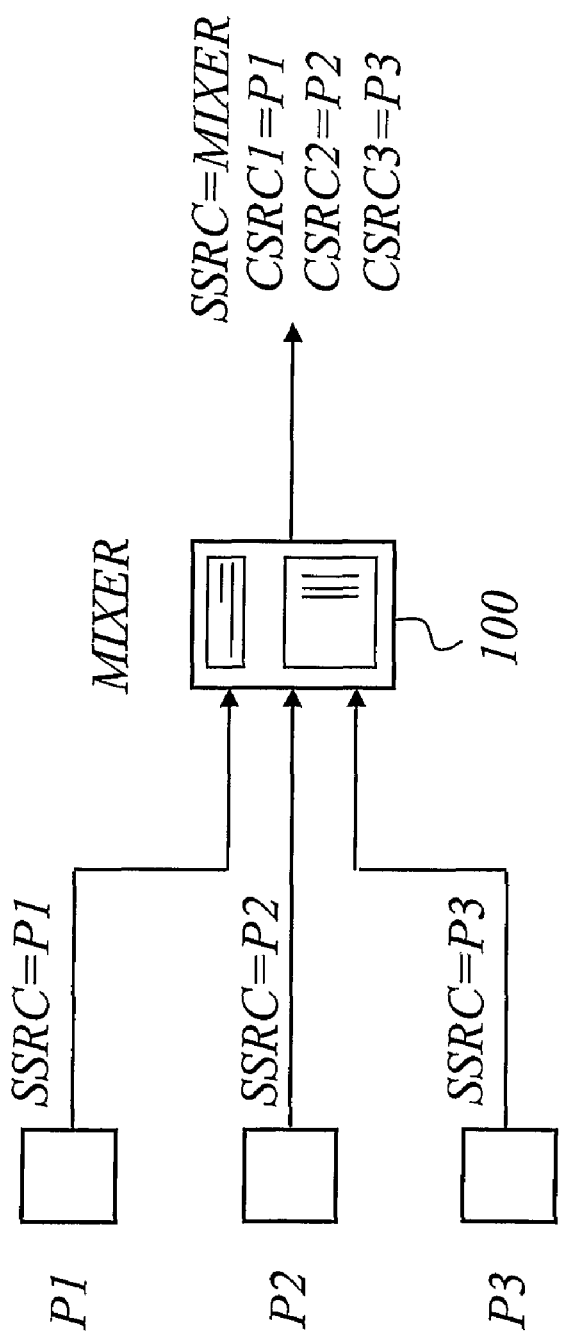
FIG. 1 is a schematic diagram illustrating a central mixer for mixing media streams from a number of participants into a single new media stream.

Throughout the drawings, the same reference characters will be used for corresponding or similar elements.

For a better understanding of the invention it may be useful to begin with a brief overview of the conventional procedure of mixing various media streams in a central mixer.

FIG. 1 is a schematic diagram illustrating a central mixer for mixing media streams from a number of participants into a single new media stream. The mixer 100 receives media data from a number of participants P1, P2, P3, each participant sending media data to the mixer 100 in an individual media stream. The mixer is then able to mix the media content from a selected number of participants into a new mixed media stream for transport to a selected one of the participants or to a new participant (not shown). In the particular example of media communication based on the Real-time Transport Protocol (RTP), an RTP session is identified in each node by a network address and a pair of ports [1]. One port is used for media data and the other is used for control data. A participant is normally a single machine, host or user participating in the session. Participation can be passive reception, active transmission or both. Each media type is normally transmitted in a different session. For example, if both audio and video are used in a conference call, one session is typically used for audio and another session for video. This enables participants to select which media type(s) they want to receive; e.g. a participant with a low-bandwidth connection may decide to receive only the audio portion of a conference call. When media data packets are transmitted, there are two fields in the header of an RTP data packet that are of particular importance to media stream communication, namely the SSRC and CSRC fields. SSRC stands for Synchronization Source and identifies a unique RTP sender. CSRC stands for Contributing Source or Content Source and identifies the contributing sources of the mixed media payload. The number of contributing sources is indicated by a CSRC count field. There can typically be up to 16 contributing sources. If there are multiple contributing sources, the payload is the mixed data from these sources. With reference to FIG. 1, it can be seen that each of the participants P1, P2, P3 send an individual media stream to the mixer 100 with an SSRC that corresponds to the payload source. The mixed media stream from the mixer 100 has an SSRC that corresponds to the mixer. The CSRC values identify the contributing sources P1, P2, P3 of the mixed media stream.

As previously explained, when mixing of media is performed by a central mixer in the prior art systems, the possibilities for a more personalized rendering of the incoming media by the participants are limited. In addition, the variation in capabilities of different participants is not accounted for, nor exploited in the prior art.

Figure 2:
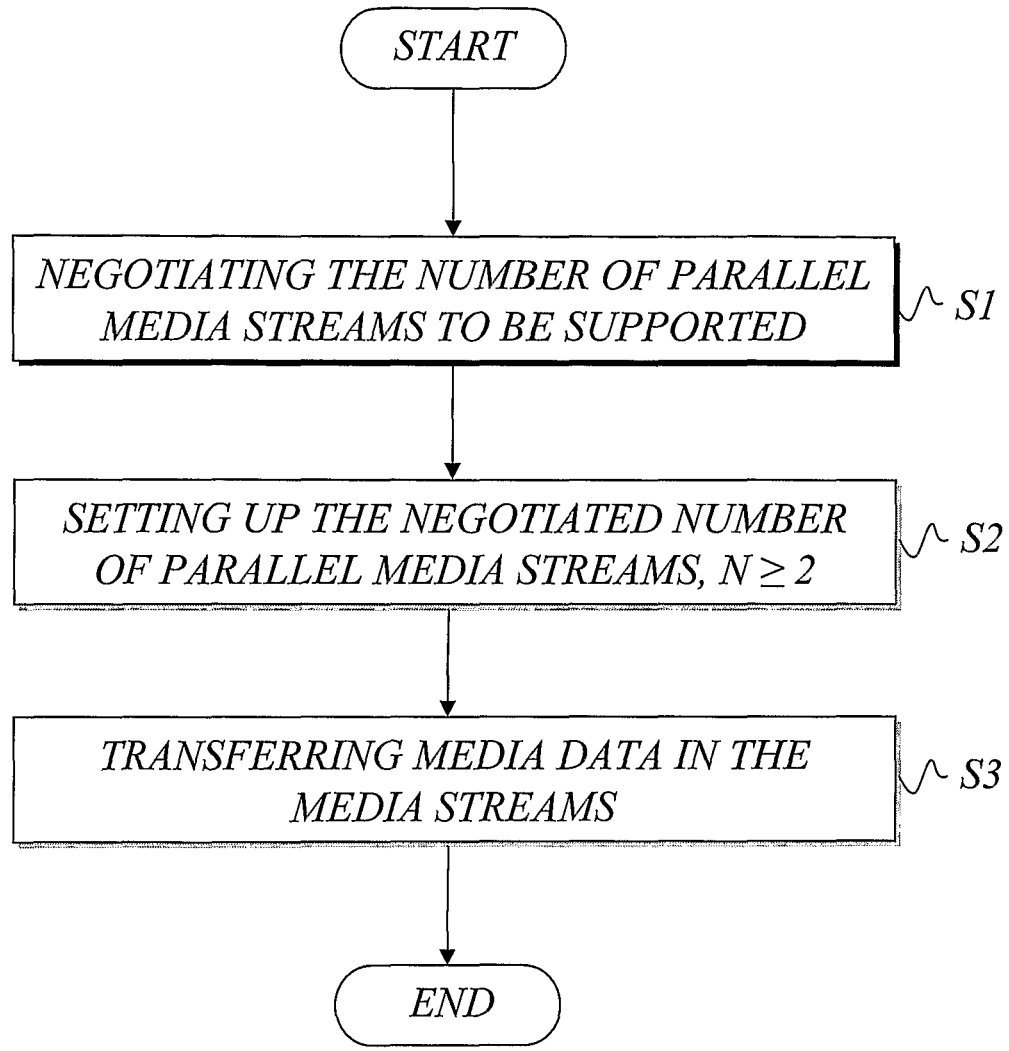
FIG. 2 is a schematic flow diagram of a method of media communication according to an exemplary embodiment.

FIG. 2 is a schematic flow diagram of a method of media communication according to an exemplary embodiment of the present invention. A basic idea for more efficient media communication between two nodes in a group communication system is to set up a number, N, of parallel, separate media streams of the same media type in a given direction between the nodes, where N is equal to or greater than 2. Before setting up the media streams, the actual number of parallel, separate media streams is negotiated in step S1. Once the negotiation is completed, the media streams are established in step S2. Media data of the same type can then be transferred in parallel, separate media streams in step S3, where each media stream may include media data from a separate media source or from a mix of media sources.

This means that for a typical media application involving audio and video, there may be multiple audio streams and/or multiple video streams between two communicating nodes. In this way, a richer and/or more personalized rendering of the media data is enabled since media data may be transported as individual media streams and processed locally in a participant, rather than processed and mixed into a single stream by a central mixer.

As an example, the principle of a regular conference bridge is to add all active talkers into one single voice stream that is transported to the participants. The voice streams to the participants are however not identical since the voice from a participant need to be excluded in the data sent back to the same participant in order to avoid echo problems. A richer experience may be achieved with the use of spatialised audio in conference calls. With spatialised audio the respective participants can be positioned at separate locations in a virtual audio space. The spatialisation may be performed in the central point, and the spatialised audio is then sent as a stereo audio media stream to the participants. A more personalized spatialisation may however be performed by an individual participant, if the contributing audio streams were available for the participant. Thus, there are cases in a tightly coupled conference where it is desired to send the media from the participants as individual streams from the central point to (at least some of) the participants, i.e. to mix the media streams locally at the participant rather than centrally in a mixer in the control point.

For participants with a very high processing capacity and a high bandwidth access, all the media from the participants may then be transmitted to the participant by the central point. Many participants (e.g. mobile terminals) may however only have limited processing capacity. Since each input media stream has to be processed with jitter buffer handling, media decoding, and subsequent media processing, and so forth, some participants may only have the capacity to receive and process a limited number of input streams. Also, the available bandwidth may put restrictions on the number of media streams that can be sent between the central point and the participant.

The proposed negotiation procedure allows for a flexible number of individual media streams (and optionally also selectable media format of one or more of the media streams) between any two nodes such that the richest possible communication is achieved, according to the capabilities of the considered nodes.

Naturally, the number of media streams of the same media type to be established in the opposite direction between the considered nodes can also negotiated.

If the negotiation procedure is extended to include media format, it is possible to have different media formats in the two directions.

Figure 3:
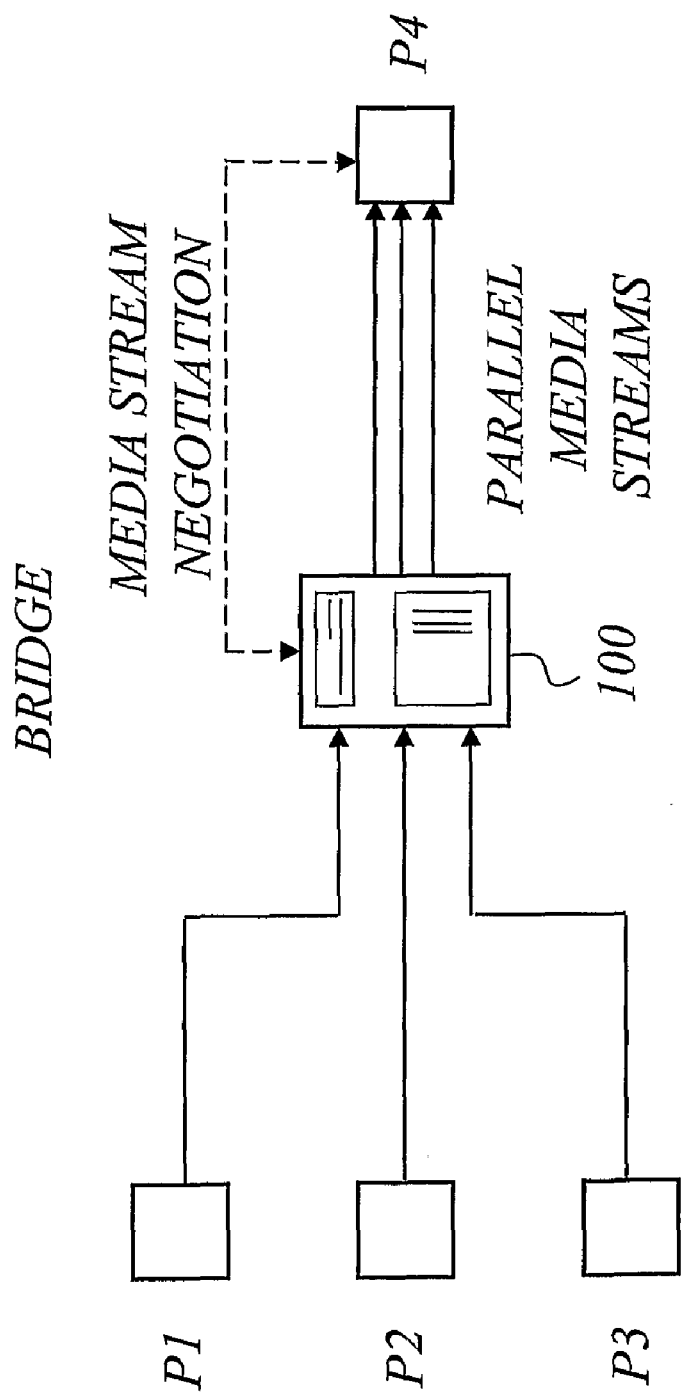
FIG. 3 is a schematic diagram of an exemplary simplified group communication system with the ability to support a number of parallel media streams based on media stream negotiation.

FIG. 3 is a schematic diagram of an exemplary simplified group communication system with the ability to support a number of parallel media streams based on media stream negotiation. In this example, the group communication system includes a central bridge 100 and a number of participants P1-P4. The bridge 100 receives media content from a number of participants P1-P3. Instead of simply mixing all the media streams into a single stream intended for participant P4/node 200, the bridge according to the invention is involved in a negotiation procedure with participant P4 to find out how many individual media streams of the same media type that can be supported between the bridge and participant P4 in a given direction, alternatively in each direction. Once the negotiation is finalized, parallel, separate media streams are set up between the bridge 100 and the participant P4, and media data is then transferred over the parallel media streams.

Figure 4:
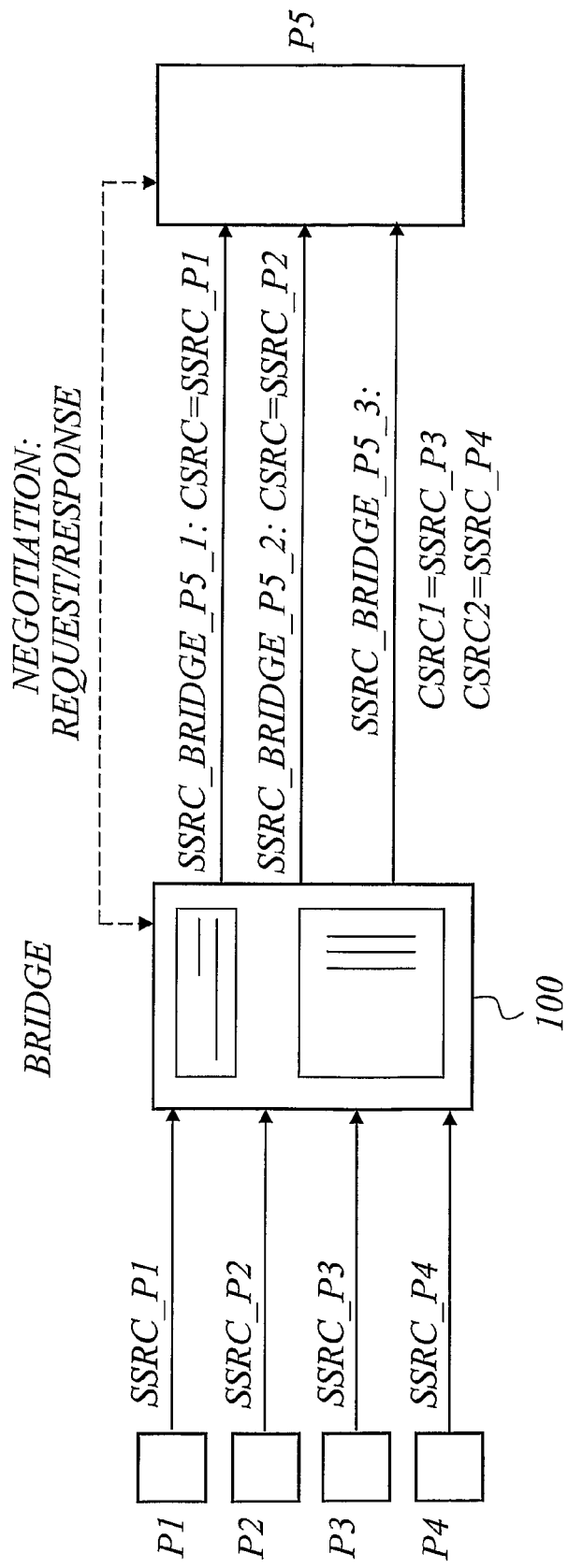
FIG. 4 is a schematic diagram of a particular example of RTP (Real-time Transport Protocol) based media stream communication involving negotiation of the number of supported media streams.

For a deeper understanding of the invention reference will now be made to FIG. 4, which illustrates an example of the invention in the specific context of media stream communication based on the RTP protocol. In this particular example, a bridge 100 is communicating with a specific participant node 200, also referred to as participant P5. The bridge receives media content from a number of other participants P1-P4. After negotiation of the number of parallel media streams to be supported for a given type of media (such as audio or video), the parallel media streams between the bridge 100 and the considered participant node 200 are established.

For example, the negotiation may be performed by using a handshake procedure based on a negotiation request and a corresponding negotiation response. The negotiation procedure may be initiated by the central bridge or by an individual participant node. In the latter case, the participant node preferably send a negotiation request to the central communication bridge including information on how many parallel separate media streams of the same media type the participant node can handle in a given direction between the participant node and the bridge. The participant node then typically receives a negotiation response from the central communication bridge to enable establishment of a flexible number of parallel, separate media streams of the same media type in the considered direction. The response may be a simple acknowledgement, or may alternatively include information on the number of streams supported by the responding node (the bridge in this example).

Preferably, each node communicates to the other node capability information regarding how many simultaneous incoming media streams of the same media type and how many simultaneous outgoing media streams of the same media type the node can support, and the number of media streams of the same media type in each direction between the nodes is negotiated based on this capability information. This opens up for an asymmetric number of media streams in the two directions.

In this example, three individual media streams are established in the direction from the bridge to participant P5. These media streams are identified by three individual SSRC values, denoted SSCR_BRIDGE_P5_1, SSCR_BRIDGE_P5_2, SSCR_BRIDGE_P5_3. The media content transferred over the media streams is identified by the corresponding CSRC values. In this case, the first media stream is carrying media content from participant P1 (CSRC=SSRC_P1), the second media stream is carrying media content from participant P2 (CSRC=SSRC_P2), and the third media stream is carrying a mix of media content originating from participants P3 and P4 (CSRC1=SSRC_P3, CSRC2=SSRC_P4).

A problem with the transmission and reception of media from a subset of the participants is to detect when the central bridge has stopped transmitting packets from one participant and instead started transmitting from another participant. Due to the jitter of the transmission, the packets do not arrive in exact order. Hence, to detect that the central bridge has stopped transmitting media from a first participant and started transmitting from a second participant, some delay may have to be introduced before a firm decision can be taken that no packets are arriving that originates from this first participant. If the receiving participant only has the possibility to process a fixed number of media streams, this means that the processing of the new media stream from the second participant may not be started until the decision has been taken to stop the processing of the media stream from the first participant. This will result in a delay or latency before a new participant is processed and may introduce clipping of the media.

However, to avoid this problem the invention suggests that a receiving participant continuously monitors the contributing source(s) in packets transported over any given media stream to detect a change in identity of media source. When a new participant is switched onto a supported media stream the identity of the contributing source (CSRC) will change in packets transported over this media stream, and the receiving participant then has the ability to detect this and immediately start processing media data from the new participant.

Figure 5:
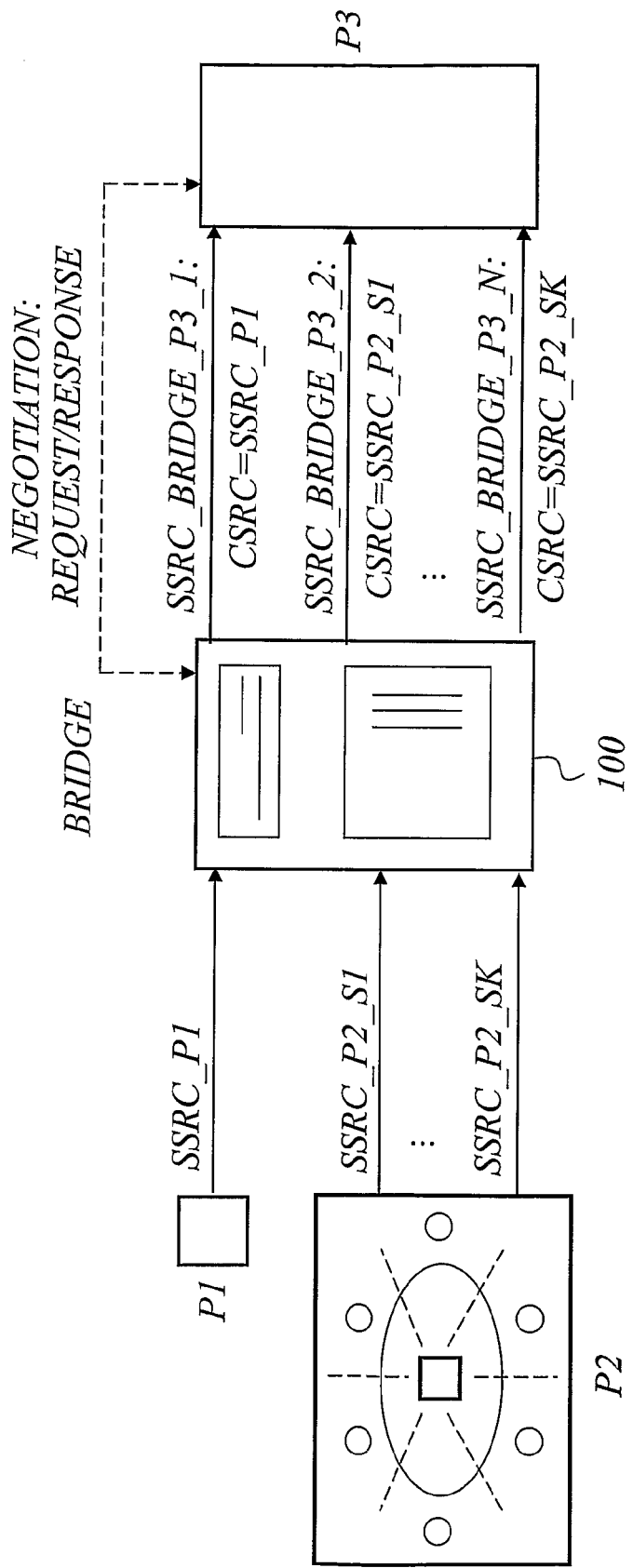
FIG. 5 is a schematic diagram of another example of RTP (Real-time Transport Protocol) based media stream communication involving negotiation of the number of supported media streams.

The above description mainly relates to the case where the central point has the ability to send multiple streams. A similar situation may also occur if a terminal has the ability to separate the media input such as the audio input into individual sources, e.g. using source separation based on multi-microphone techniques. Then each individual audio source (usually an individual talker but also other sound sources may be considered) may be sent as individual signal sources from a participant to the central point, as schematically illustrated in FIG. 5. In this example, participant P2 has the ability to separate the local media input into separate media sources, and transporting the separated media sources on parallel media streams to the bridge 100. Preferably, each stream is identified by an SSRC that corresponds to the individual media source, e.g. SSRC_P2_S1, . . . , SSRC_P2_SK, where P2 represent participant node P2, and S1 to SK represent the separated media sources. In this example, the bridge 100 also maps the active media sources onto a number, N, of outgoing media streams destined for another participant P3. The outgoing media streams are identified by individual SSRC values, denoted SSCR_BRIDGE_P3_1 to SSCR_BRIDGE_P3_N. In this case, the first outgoing media stream from the bridge 100 to participant P3 is carrying media content from participant P1 (CSRC=SSRC_P1). The second outgoing media stream is carrying media content from media source S1 of participant P2 (CSRC=SSRC_P2_S1), and so on up to the last outgoing media stream, which carries media content from media source SK of participant P2 (CSRC=SSRC_P2_SK).

Figure 6:
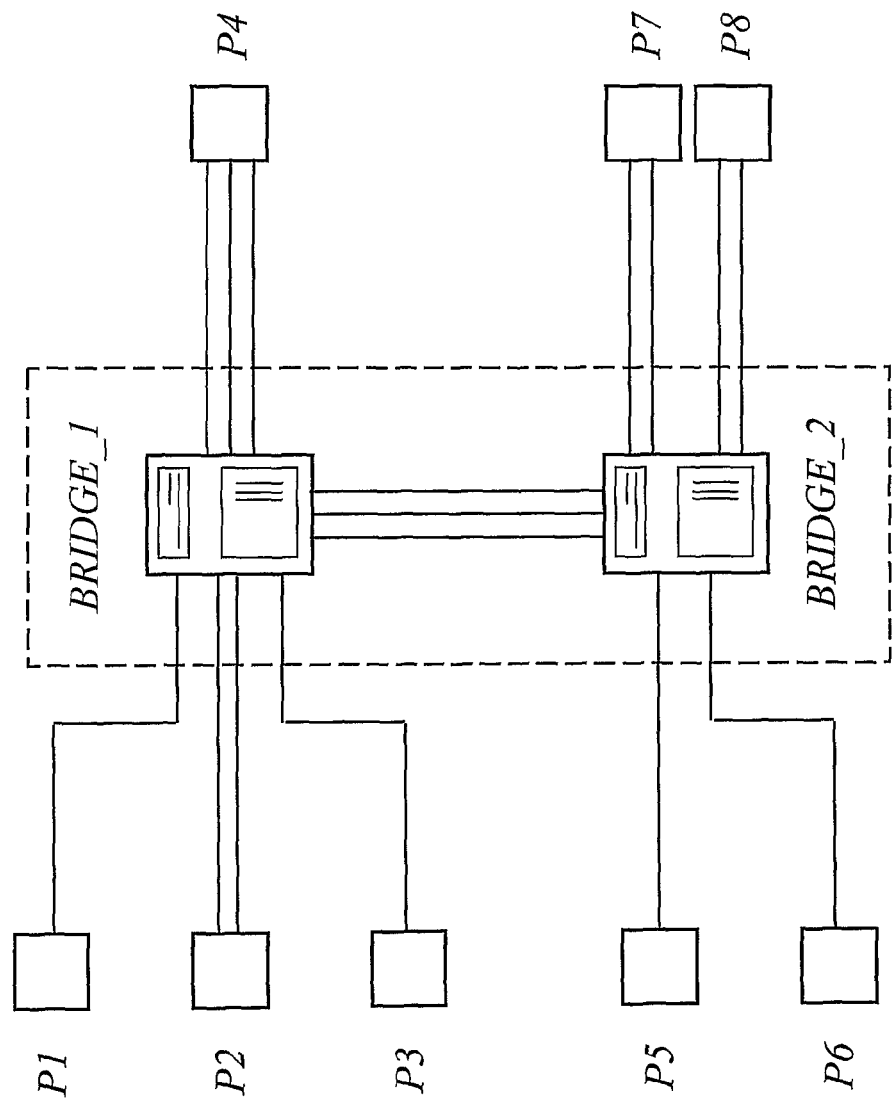
FIG. 6 is a schematic diagram illustrating an exemplary group communication system involving two or more communication bridges, each responsible for a sub-set of the participants.

Yet another situation where the technology may be used relates to the case when the mixing is performed with several bridges, i.e. where each bridge supports a sub-set of participants, as schematically illustrated in FIG. 6. The communication between the bridges may then have the possibility of sending and receiving several individual streams in each direction.

In the following, the present technology will mainly be described with reference to packet transmission of media streams between a central point and participants (nodes) in a multi party conference "call". In particular, the description below will focus on communication set up and media transport between two nodes so that the full capability (with respect to media processing, capturing and rendering) of each node may be exploited.

Figure 7:
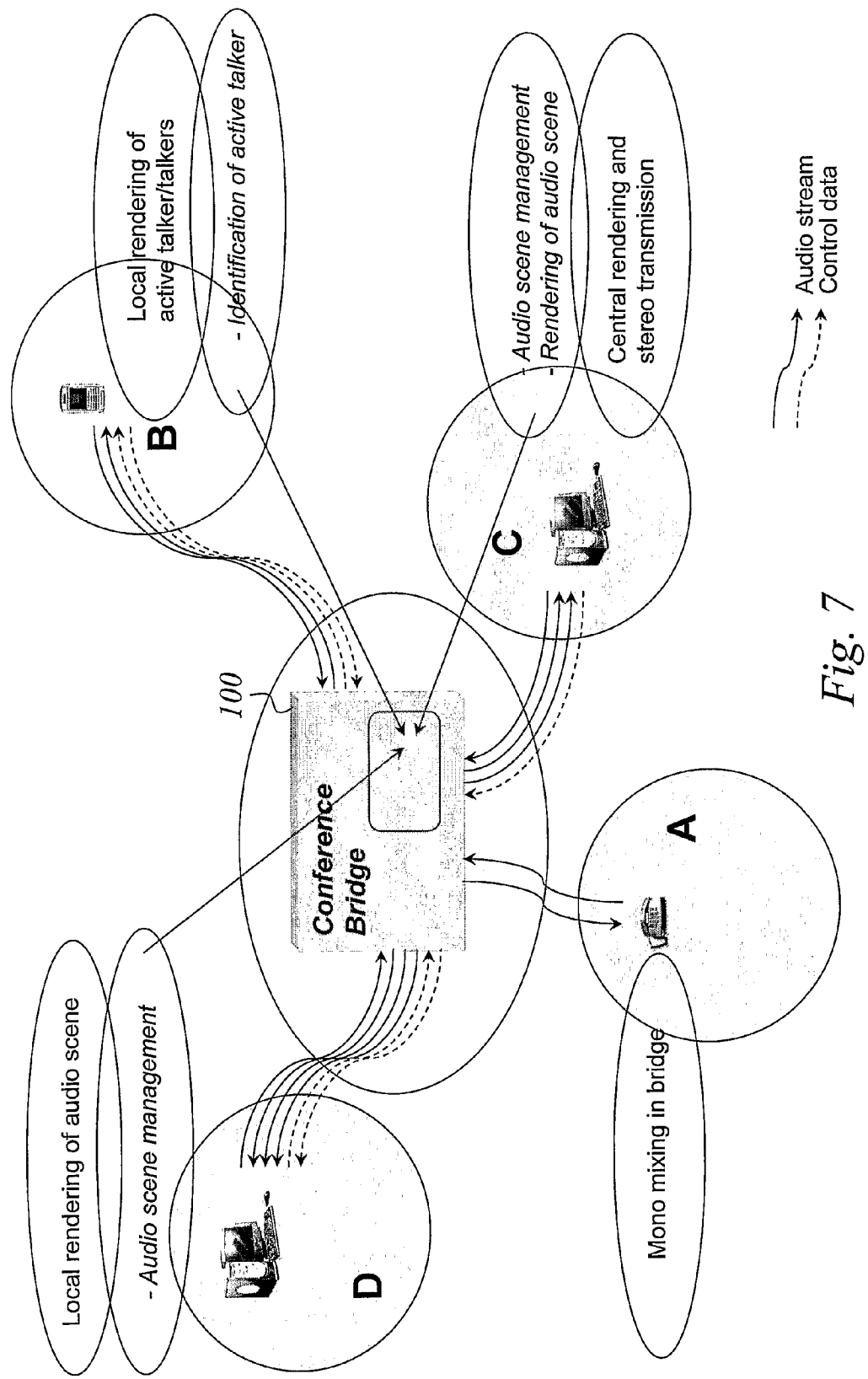
FIG. 7 is a schematic diagram illustrating an example of a scenario with media streams of individual formats between a conference bridge and participants with varying capabilities.

A typical scenario is shown in FIG. 7 where different types of mixing and transport of media between a conference bridge and participants with varying capabilities are illustrated. The mixing in the conference bridge 100 typically include adaptation to the specific processing and rendering capabilities of each participant, thus allowing participants with a large variety of processing capacity and access technology to take part in the same conference, while at the same time utilizing their full capacity for creating rich media.

A basic concept in this context is the set-up method and packet transport that allows for a flexible number of media streams and/or format of each individual media stream between two nodes involved in a multimedia session. It should be noted that since streams of the same media type (e.g. voice) are conceptually connected, they should generally not be handled as independent media streams. The involved nodes must be aware of the fact that the streams represent different parts of the same session.

During the setup of such a session, each node preferably specifies how many incoming and outgoing media streams it can handle and the number of streams to be set up is negotiated so that the richest possible communication is achieved.

For example, participant A is an ordinary telephone with mono rendering capabilities, and only a single audio/voice stream is established in each direction between the central conference bridge 100 and participant A. Participant B is a mobile unit with the possibility of local rendering of active talker(s), and therefore a set of audio streams are established in each direction along with associated control channels. The central bridge 100 is responsible for identifying active talkers and mapping the corresponding audio sources (talkers) onto the established media streams. Participant C is a multimedia station (e.g. a computer) which receives centrally rendered media (at least audio) in stereo transmission. The central bridge 100 is responsible for audio scene management and rendering of the audio scene. Participant D is a multimedia station having a set of incoming media streams from the bridge 100, and at least one outgoing media stream to the bridge. The multimedia station D performs local rendering of the audio scene, while the conference bridge is responsible for audio scene management.

Naturally other examples and scenarios may be envisaged, e.g. involving multiple independent video streams between a participant and the central bridge in any given direction. Of course other types of media including even text-based content can also be transmitted in the group communication systems of the invention.

In a preferred exemplary embodiment, it is suggested to have separate identities for the available media streams that can be transmitted between the central point and a given participant.

For example, when using RTP for the communication this means that the available media streams between the mixer and the participant will have separate SSRC, e.g. SSRC_BRIDGE_A_1, SSRC_BRIDGE_A_2, . . . , SSRC_BRIDGE_A_N, where N is the maximum number of media streams that can be sent between the central point and a specific participant, denoted A. The maximum number N of media streams is preferably negotiated at call setup, as previously described. The active media sources, as normally decided upon by the central point, are then mapped onto these media streams and the corresponding SSRC's from the originating participant is preferably used for the CSRC in the packets.

Figure 8:
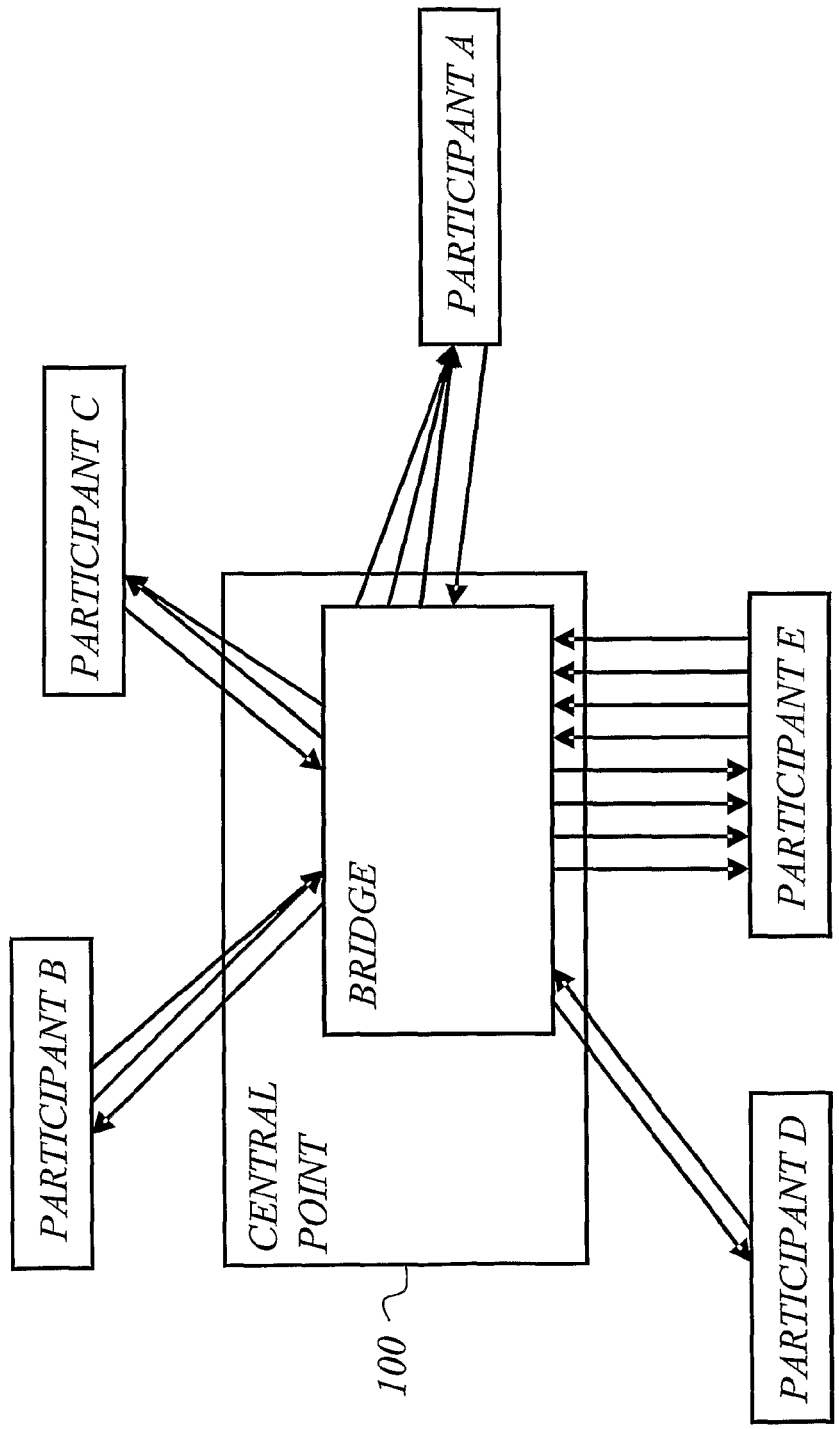
FIG. 8 is a schematic diagram illustrating yet another example of media streams between a central communication bridge and participants in a group communication system.

FIG. 8 is a schematic diagram illustrating another example of media streams between a central communication bridge and participants in a group communication system. In this illustrative scenario, participant A has the capability to receive three simultaneous media streams. In an exemplary conference, the first participant producing an active media is participant B. The media originating from participant B is then subsequently transmitted from the central point to participant A using the interface/stream identified by SSRC_BRIDGE_A_1 and with SSRC_B used as CSRC_BRIDGE_A_1 in the RTP packets.

Next, two more participants, C and D in turn, start producing media decided as active by the central point, and these are transmitted to participant A employing SSRC_BRIDGE_A_2 with SSRC_C as CSRC_BRIDGE_A_2, and SSRC_BRIDGE_A_3 with SSRC_D as CSRC_BRIDGE_A_3, respectively.

If a fourth participant, E, starts to produce active media, this media cannot be transmitted to participant A simultaneously with the media from participants B, C, and D, since participant A only has the possibility to receive and process media from three other participants. Hence, the central point has to decide on which of the four incoming media streams to pass on to participant A. If, as an example, participant C is decided by the central point to produce the least active media, then media from participant C is no longer transmitted to participant A, and the media from participant E is instead transmitted to participant A using SSRC_BRIDGE_A2 with SSRC_E as CSRC_BRIDGE_A_2 in the RTP packets.

Since the CSRC in the packets from the central point with SSRC_bridge_A2 has changed, participant A then has the ability to immediately detect this and start processing the media from participants E without any delay. This alleviates any potential problems of latency in the processing of a new active participant.

Preferably, the number of media streams and/or format of each individual stream is/are negotiated based on a general session description protocol implemented with an attribute for capability information related to the number of media streams of the same media type that can be simultaneously supported and/or media format information. The Session Description Protocol (SDP) [2] is an example of a suitable protocol that can be extended with attribute information for negotiating the number of media streams and/or media format. For example, in VoIP (Voice over IP) applications using the Session Initiation Protocol (SIP) [3] the negotiation may be performed using an extension of SDP. The number of media streams and the individual format of each media stream may for example be negotiated as follows.

Example

Asymmetric Number of Streams

Figure 9:
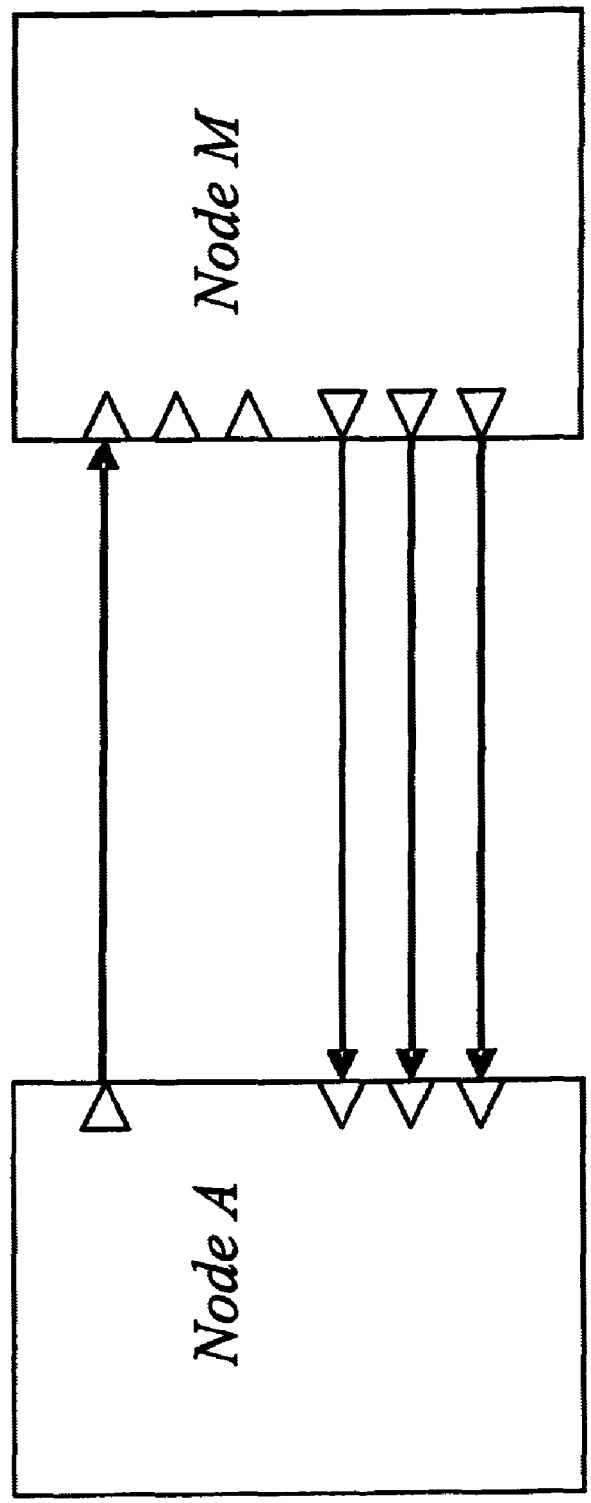
FIG. 9 is a schematic diagram illustrating an example of two nodes with different send and receive capabilities.

Assume that a node A can receive three incoming streams and send one stream, and a node M can both send and receive three streams, as illustrated in FIG. 9. Note that a node in this context may be either a central point or a participant.

In order to negotiate the number/format of the media streams so as to utilize the full processing and rendering capabilities, node A sends an offer with an Adaptive Multi-Rate Wide-Band (AMR-WB) stream but also specifies that it can handle 3 parallel incoming streams. The media streams are set to inactive since the number of streams needs to be negotiated before setting up the resources required for coding and decoding. This can for example be achieved with the following attributes in the SDP:

```
m=audio 5000 RTP/AVP (Audio Visual Profile) 96 97
a=rptmap:96 AMR-WB/16000/1
a=fmtp:96
a=parallelstreams: recv 3 send 1
a=inactive
```

Node M recognizes the processing and rendering capabilities expressed by node A (it may also set up the resources for decoding the single incoming media stream at this point, or alternatively later) and answers:

```
m=audio 7002 RTP/AVP 96
a=rptmap:96 AMR-WB/16000/1
a=parallelstreams: recv 1 send 3
a=inactive
```

Node A now knows that node M supports 3 parallel outgoing streams and can therefore set up the needed resources for decoding three parallel streams. The streams are then activated by sending an update SDP message:

```
m=audio 5000 RTP/AVP 96
a=rptmap:96 AMR-WB/16000/1
a=parallelstreams: recv 3 send 1
a=sendrecv
```

Finally, node M answers with an update SDP message:

```
m=audio 7002 RTP/AVP 96
a=rptmap:96 AMR-WB/16000/1
a=parallelstreams: recv 1 send 3
a=sendrecv
``` and the RTP communication may be started.

Example

Asymmetric Media Format

Assume that node C has the capability of receiving in stereo (more generally multi-channel audio) but only transmitting in mono, and node M can both send and receive in stereo (multi-channel audio).

Node C then sends the SDP offer:

```
m=audio 5000 RTP/AVP 96 97
a=rptmap:96 AMR-WB/16000/1
a=fmtp:96
a=asymmetricmedia: recv 97
a=rptmap:97 AMR-WB/16000/2
a=fmtp: 97
a=inactive
```

Node M recognizes these attributes and sends the SDP answer:

```
m=audio 7002 RTP/AVP 96
a=rptmap:96 AMR-WB/16000/1
a=inactive
m=audio 7004 RTP/AVP 97
a=rptmap:97 AMR-WB/16000/2
a=asymmetricmedia: send 97
a=inactive
```

This is acknowledged by node C by the SDP update:

```
m=audio 5000 RTP/AVP 96
a=rptmap:96 AMR-WB/16000/1
a=sendonly
m=audio 5000 RTP/AVP 97
a=rptmap:97 AMR-WB/16000/2
a=recvonly
``` and node M answers:

```
m=audio 7002 RTP/AVP 96
a=rptmap:96 AMR-WB/16000/1
a=recvonly
m=audio 7004 RTP/AVP 97
a=rptmap:97 AMR-WB/16000/2
a=sendonly
``` and then the RTP communication may be started.

Figure 10:
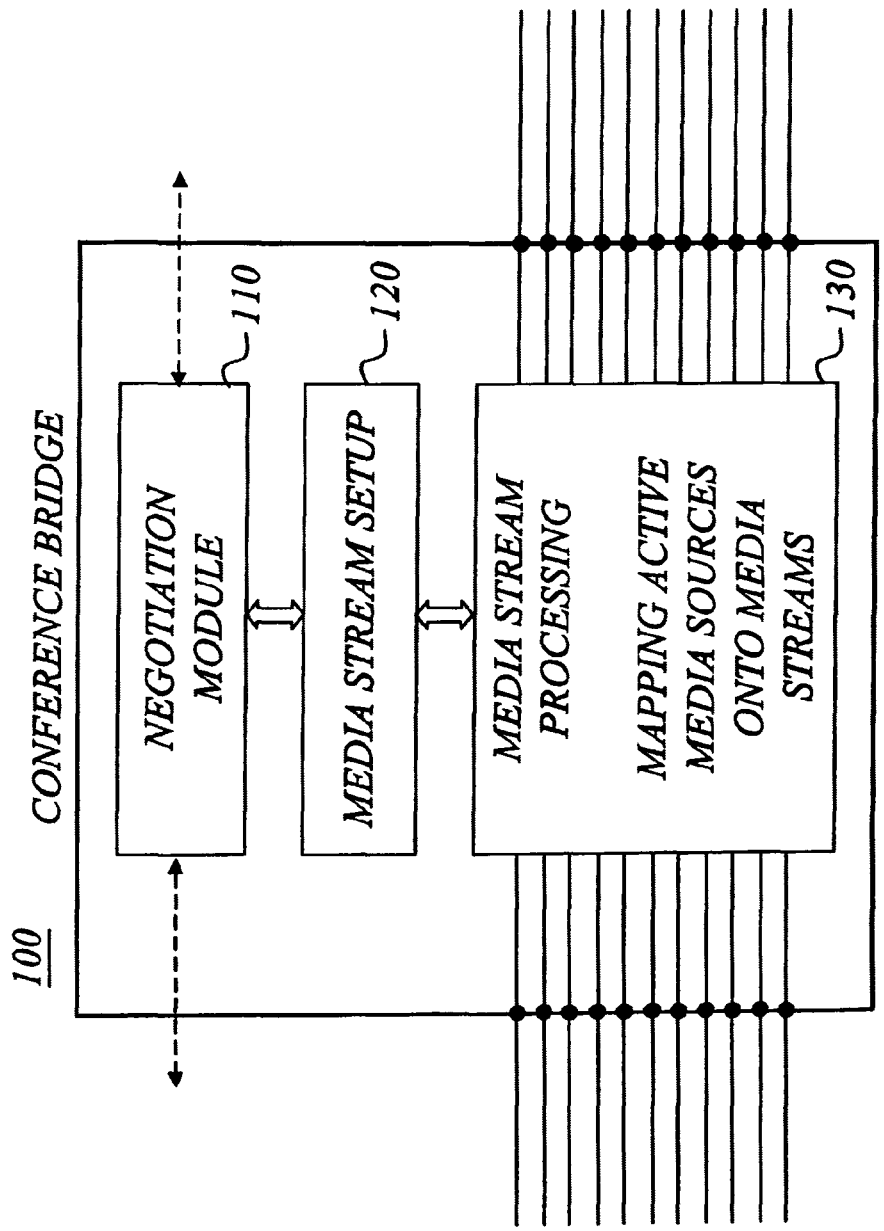
FIG. 10 is a schematic block diagram of a conference bridge or similar communication bridge according to an exemplary embodiment.

FIG. 10 is a schematic block diagram of a conference bridge or similar communication bridge according to an exemplary embodiment. The bridge 100 presented in FIG. 10 is basically implemented as a server equipped with functionality for handling media streams in a group communication system. The exemplary bridge 100 comprises a negotiation module 110, a media stream setup module 120, and a general module 130 for media stream processing and mapping of active media sources onto the established media streams. The negotiation module 110 is responsible for negotiating the number of media streams and/or media format with participants in the group communication system, or alternatively with another communication bridge. The result of the negotiation is forwarded to the media stream setup module 120, which is responsible for establishing the media streams. The module 130 takes care of media stream processing including coding/decoding and tasks such as media scene management, central media scene rendering. The module 130 is also responsible for identifying active media sources, as well as mapping of the active sources onto the supported media streams. In addition to mapping of a specific media source onto an individual media stream, the mapping of media content onto media streams may also include traditional mixing of content from several sources onto a particular media stream.

The embodiments described above are merely given as examples, and it should be understood that the present invention is not limited thereto. Further modifications, changes and improvements which retain the basic underlying principles disclosed and claimed herein are within the scope of the invention.

REFERENCES

[1] *Real-time Transport Protocol* (RTP), RFC 1889.
[2] *Session Description Protocol* (SDP), RFC 2327.
[3] *Session Initiation Protocol* (SIP), RFC 2543.

The invention claimed is:

1. A method for media communication between two nodes in a group communication system, a first one of said two nodes being a central communication bridge and a second one of said two nodes being a participant node or another central communication bridge, the method comprising:
    setting up at least two parallel, separate media streams of the same media type in a first direction between said nodes for transfer of media data from separate media sources in said parallel, separate media streams;
    negotiating the actual number of said parallel, separate media streams in said first direction before setting up the media streams;
    wherein said step of negotiating the actual number of said parallel, separate media streams in said first direction comprises the steps:
        said first node communicating to said second node a negotiation request including information on how many separate media streams of the same media type said first node can handle in said first direction; and
        said first node receiving, from said second node, a negotiation response for concluding the negotiation; and
    transferring media data in said at least two parallel, separate media streams, each media stream including media data from a separate media source or from a mix of media sources, thereby enabling media data to be processed locally in a participant, rather than processed and mixed into a single stream by a central mixer.

2. The method of claim 1, wherein said negotiation response includes information on how many individual media streams of the same media type said second node can handle in said first direction between said nodes.

3. The method of claim 1, wherein at least one media stream is set up in a second direction between said nodes, and the actual number of media streams of the same media type in said second direction is also negotiated before setting up the media streams.

4. The method of claim 3, wherein each node communicates to the other node capability information regarding how many simultaneous incoming media streams of the same media type and how many simultaneous outgoing media streams of the same media type the node can support, and the number of media streams of the same media type in each direction between the nodes is negotiated based on said capability information.

5. The method of claim 4, wherein the number of negotiated media streams in one direction differs from the number of negotiated media streams in the other direction.

6. The method of claim 1, wherein the number of media streams is negotiated based on a general session description protocol implemented with an attribute for capability information related to the number of media streams of the same media type that can be simultaneously supported.

7. The method of claim 1, wherein the media format of at least one of said separate media streams is also negotiated at connection set-up.

8. The method of claim 7, wherein at least a first media format is negotiated for a given media stream in one direction, and at least a second different media format is negotiated for said media stream in the other direction.

9. The method of claim 1, wherein active media sources are mapped onto said separate media streams.

10. The method of claim 9, wherein a receiving node detects a change in identity of media source in packets transported over a given media stream so that the receiving node can immediately start processing media data from a new media source in response to a detected change in media source identity.

11. The method of claim 9, wherein said media sources correspond to separate participants in a multi-party conference call.

12. The method of claim 9, wherein said media sources correspond to separate media sources originating from a single node connected to said conference communication system.

13. A system for media communication between two nodes in a group communication system, a first one of said two nodes being a central communication bridge and a second one of said two nodes being a participant node or another central communication bridge, the system comprising:
    a first processor in the first node configured for setting up at least two parallel, separate media streams of the same media type in a first direction between said nodes for transfer of media data from separate media sources in said parallel, separate media streams;
    the first processor further configured for negotiating the actual number of said parallel, separate media streams in said first direction before setting up the media streams;
    a second processor in the second node that is configured to receive, in the second node, from the first node a negotiation request including information on how man separate media streams of the same media type said first node can handle in said first direction;

the second processor is further configured, in said second node, for communicating a negotiation response to said first node for concluding the negotiation; and the first processor further configured for transferring media data in said at least two parallel, separate media streams, each media stream including media data from a separate media source or from a mix of media sources, to enable media data to be processed locally in a participant, rather than processed and mixed into a single stream by a central mixer.

14. The system of claim 13, wherein said second processor configured for communicating a negotiation response is further configured for communicating information on how many individual media streams of the same media type said second node can handle in said first direction between said nodes.

15. The system of claim 13, wherein:
The first processor is further configured for setting up at least one media stream in a second direction between said nodes; and
The first processor is further configured for negotiating the actual number of media streams of the same media type in said second direction negotiated before setting up the media streams.

16. The system of claim 15, wherein:
the first node and second node are each configured for communicating to the other node capability information regarding how many simultaneous incoming media streams of the same media type and how many simultaneous outgoing media streams of the same media type each respective node can support, and
wherein the number of media streams of the same media type in each direction between the nodes is negotiated based on said capability information.

17. The system of claim 16, wherein the number of negotiated media streams in one direction differs from the number of negotiated media streams in the other direction.

18. The system of claim 13, wherein said first processor operates based on a general session description protocol implemented with an attribute for capability information related to the number of media streams of the same media type that can be simultaneously supported.

19. The system of claim 13, wherein the first processor is further configured for negotiating also the media format of at least one of said separate media streams.

20. The system of claim 19, wherein the first processor configured for negotiating the format is configured for negotiating, for a given media stream, at least a first media format in one direction and at least a second different media format in the other direction.

21. The system of claim 13, wherein the first processor is further configured for mapping active media sources onto said separate media streams.

22. The system of claim 13, wherein said two nodes include a central conference bridge and conference participant.

23. The system of claim 13, wherein said two nodes include two conference bridge modules.

24. A communication bridge for use in a group communication system, comprising:
a processor configured for setting up at least two parallel, separate media streams of the same media type in a first direction between said bridge and a further node, being a participant node or another communication bridge, in said group communication system for transfer of media data from separate media sources in said parallel, separate media streams;

the processor further configured for negotiating with said further node regarding the actual number of said parallel, separate media streams in said first direction before setting up the media streams;

the processor is further configured for receiving a negotiation request from said further node including information on how man separate media streams of the same media type said further node can handle in said first direction;

the processor is further configured for communicating a negotiation response to said further node for concluding the negotiation; and the processor is further configured for mapping separate active media sources onto said separate media streams, each media stream including media data from a separate media source or from a mix of media sources to enable media data to be processed locally in a participant, rather than processed and mixed into a single stream by a central mixer.

25. The bridge of claim 24, wherein:
the processor is further configured for setting up at least one media stream in a second direction between said bridge and said further node; and
the processor is further configured for negotiating with said further node regarding the actual number of media streams of the same media type in said second direction before setting up the media streams.

26. The bridge of claim 25, wherein:
the processor is further configured to receive capability information from said further node regarding how many simultaneous incoming media streams of the same media type and how many simultaneous outgoing media streams of the same media type the further node can support.

27. The bridge of claim 24, wherein:
the processor is configured to operate based on a general session description protocol implemented with an attribute for capability information related to the number of media streams of the same media type that can be simultaneously supported.

28. The bridge of claim 24, wherein:
the processor is further configured to negotiate with said further node regarding the media format of at least one of said separate media streams.

29. The bridge of claim 24, wherein said bridge is a conference bridge and said further node is a participant of a conference call in a conference system.

30. The bridge of claim 24, wherein said bridge is a conference bridge and said further node is another conference bridge in a conference system.

31. A participant node for use in a group communication system, the participant node comprising:
a processor configured for sending a negotiation request to a central communication bridge in said group communication system including information on how many parallel separate media streams of the same media type said participant node can handle for transfer of media data from separate media sources in said parallel, separate media streams in at least one direction between said participant node and said central communication bridge;
the processor further configured for receiving a negotiation response from said central communication bridge to enable establishment of a flexible number of parallel, separate media streams of the same media type in said at least one direction and to enable media data to be processed locally in a participant, rather than processed and mixed into a single stream by a central mixer.

* * * * *

UNITED STATES PATENT AND TRADEMARK OFFICE
CERTIFICATE OF CORRECTION

PATENT NO. : 8,385,234 B2  
APPLICATION NO. : 12/593917  
DATED : February 26, 2013  
INVENTOR(S) : Eriksson et al.

Page 1 of 1

It is certified that error appears in the above-identified patent and that said Letters Patent is hereby corrected as shown below:

On the Title Page, in Item (75), under "Inventors", in Column 1, Line 3, delete "Spănga" and insert -- Spånga --, therefor.

In the Specification:

In Column 6, Lines 38-39,  
delete "SSCR_BRIDGE_P5_1, SSCR_BRIDGE_P5_2, SSCR_BRIDGE_P5_3." and  
insert -- SSRC_BRIDGE_P5_1, SSRC_BRIDGE_P5_2, SSRC_BRIDGE_P5_3. --, therefor.

In Column 7, Line 27, delete "SSCR_BRIDGE_P3_1 to SSCR_BRIDGE_" and  
insert -- SSRC_BRIDGE_P3_1 to SSRC_BRIDGE_ --, therefor.

In Column 9, Line 6, delete "SSRC_BRIDGE_A2" and insert -- SSRC_BRIDGE_A_2 --, therefor.

In the Claims:

In Column 13, Line 1, in Claim 13, delete "man" and insert -- many --, therefor.

In Column 13, Line 20, in Claim 15, delete "The" and insert -- the --, therefor.

In Column 13, Line 23, in Claim 15, delete "The" and insert -- the --, therefor.

In Column 14, Line 7, in Claim 24, delete "man" and insert -- many --, therefor.

Signed and Sealed this  
Thirteenth Day of August, 2013

Teresa Stanek Rea  
*Acting Director of the United States Patent and Trademark Office*